US010423056B2

(12) United States Patent
Kurosaki

(10) Patent No.: US 10,423,056 B2
(45) Date of Patent: Sep. 24, 2019

(54) LIGHT SOURCE UNIT ABLE TO EMIT LIGHT WHICH IS LESS INFLUENCED BY INTERFERENCE FRINGES

(71) Applicant: CASIO COMPUTER CO., LTD., Shibuya-ku, Tokyo (JP)

(72) Inventor: Hideyuki Kurosaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/855,008

(22) Filed: Dec. 27, 2017

(65) Prior Publication Data

US 2018/0120683 A1 May 3, 2018

Related U.S. Application Data

(62) Division of application No. 14/108,073, filed on Dec. 16, 2013, now abandoned.

(30) Foreign Application Priority Data

Dec. 19, 2012 (JP) ................................. 2012-276548
Dec. 21, 2012 (JP) ................................. 2012-279029
Dec. 21, 2012 (JP) ................................. 2012-279888

(51) Int. Cl.
*G03B 21/20* (2006.01)

(52) U.S. Cl.
CPC ....... *G03B 21/208* (2013.01); *G03B 21/2033* (2013.01)

(58) Field of Classification Search
CPC .......................... G03B 21/208; G03B 21/2033

USPC ............................................. 353/94; 362/235
See application file for complete search history.

(56) References Cited

U.S. PATENT DOCUMENTS

| 6,898,216 | B1 | 5/2005 | Kleinschmidt et al. |
| 8,395,756 | B2 | 3/2013 | Wangler et al. |
| 8,857,996 | B2 | 10/2014 | Kawasumi |
| 8,985,783 | B2 | 3/2015 | Kurosaki |
| 9,217,930 | B2 | 12/2015 | Wangler et al. |
| 2002/0196414 | A1 | 12/2002 | Manni et al. |
| 2006/0274434 | A1* | 12/2006 | Mino .................. G02B 6/4214 359/811 |

(Continued)

FOREIGN PATENT DOCUMENTS

| CN | 101140358 A | 3/2008 |
| CN | 101321987 A | 12/2008 |

(Continued)

OTHER PUBLICATIONS

Chinese Office Action (and English translation thereof) dated Apr. 12, 2017, issued in counterpart Chinese Application No. 201510764917.3.

(Continued)

*Primary Examiner* — Steven Whitesell Gordon
*Assistant Examiner* — Jerry L Brooks
(74) *Attorney, Agent, or Firm* — Holtz, Holtz & Volek PC

(57) ABSTRACT

A light source unit includes a plurality of light sources that light source elements which emit laser beams and collimator lenses which collect the laser beams emitted from the light source elements are combined therein. Pencils of light emitted from the light source elements are made to be collected in different collecting degrees between the light sources respectively.

7 Claims, 17 Drawing Sheets

(56) References Cited

U.S. PATENT DOCUMENTS

Figure 1:
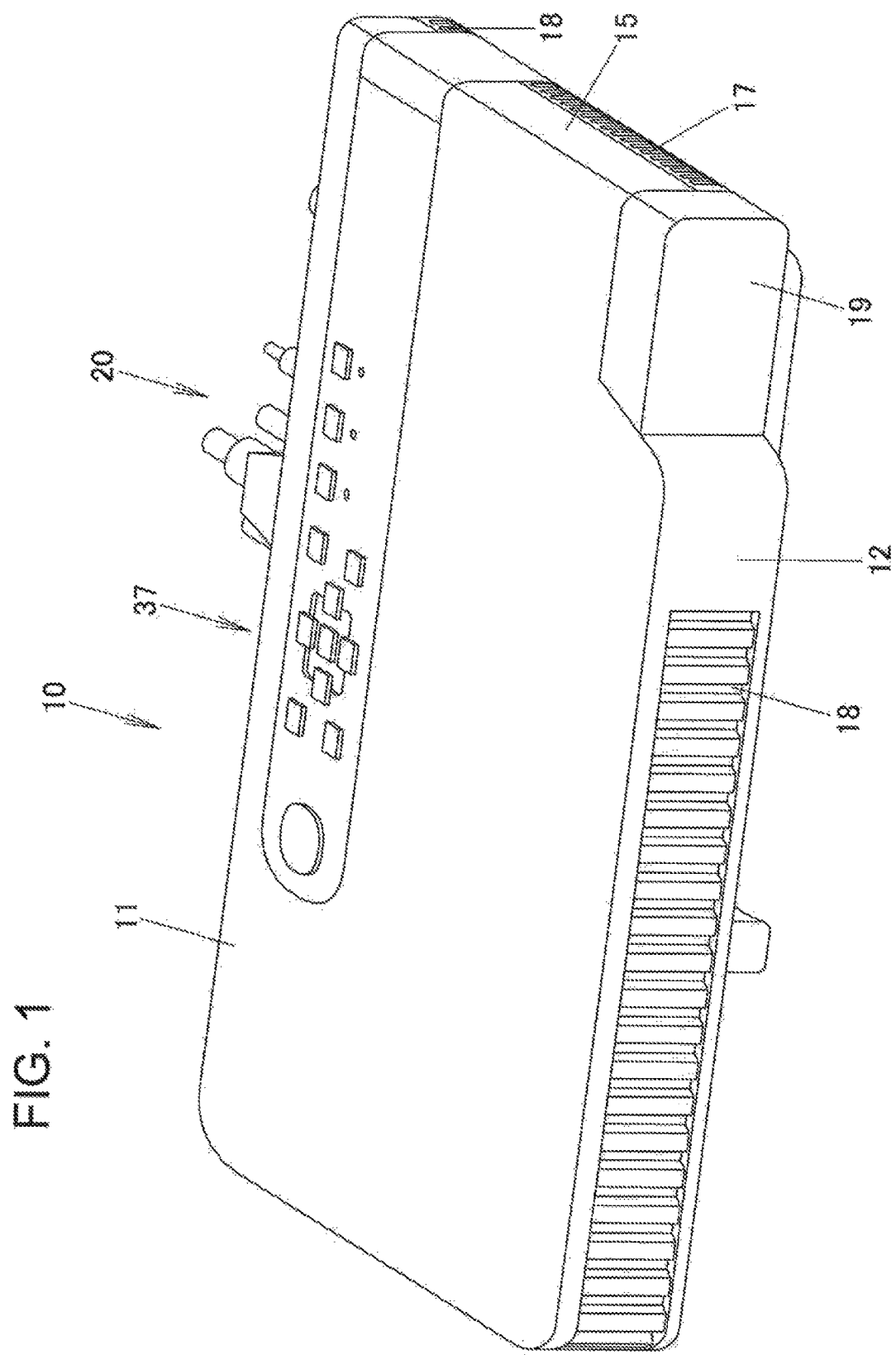

| | | |
|---|---|---|
| 2007/0127245 A1 | 6/2007 | Magarill et al. |
| 2008/0062501 A1 | 3/2008 | Shinichiro |
| 2008/0180934 A1 | 7/2008 | Oka et al. |
| 2009/0040753 A1 | 2/2009 | Matsumoto et al. |
| 2010/0033685 A1 | 2/2010 | Seo et al. |
| 2010/0238099 A1 | 9/2010 | Sumiyama |
| 2011/0096542 A1* | 4/2011 | Yabe .................. H01S 5/02 362/235 |
| 2011/0234998 A1* | 9/2011 | Kurosaki ............ G03B 21/14 353/85 |
| 2011/0249240 A1* | 10/2011 | Takahashi ............ G02B 3/10 353/33 |
| 2012/0133898 A1* | 5/2012 | Chang ................ G03B 21/28 353/31 |
| 2012/0162615 A1 | 6/2012 | Sawai et al. |
| 2012/0249972 A1* | 10/2012 | Kurosaki ........... G03B 21/2013 353/31 |
| 2012/0249974 A1* | 10/2012 | Ogino ............... G03B 21/2013 353/38 |
| 2014/0347608 A1 | 11/2014 | Kato |
| 2015/0168820 A1 | 6/2015 | Kurosaki |
| 2016/0077446 A1 | 3/2016 | Wangler et al. |

FOREIGN PATENT DOCUMENTS

| | | |
|---|---|---|
| CN | 102736383 A | 10/2012 |
| CN | 102799079 A | 11/2012 |
| CN | 103946737 A | 7/2014 |
| JP | 2003121777 A | 4/2003 |
| JP | 2004503923 A | 2/2004 |
| JP | 2008185628 A | 8/2008 |
| JP | 2009518812 A | 5/2009 |
| JP | 2010244021 A | 10/2010 |
| JP | 2011133782 A | 7/2011 |
| JP | 2011197597 A | 10/2011 |
| JP | 2012123948 A | 6/2012 |
| WO | 0205038 A2 | 1/2002 |
| WO | 2007067411 A1 | 6/2007 |

OTHER PUBLICATIONS

Chinese Office Action (and English translation thereof) dated Aug. 11, 2016 issued in counterpart Chinese Application No. 201510764890.8.

Chinese Office Action (and English translation thereof) dated Mar. 16, 2017 issued in counterpart Chinese Application No. 201510764890.8.

Chinese Office Action (and English translation thereof) dated Mar. 8, 2016, issued in counterpart Chinese Application No. 201310757214.9.

Chinese Office Action dated Aug. 3, 2016 issued in counterpart Chinese Application No. 201510764917.3.

Japanese Office Action (and English translation thereof) dated May 11, 2017, issued in counterpart Japanese Application No. 2012-279029.

Japanese Office Action (and English translation thereof) dated Sep. 29, 2016, issued in counterpart Japanese Application No. 2012-276548.

Japanese Office Action (and English translation thereof) dated Sep. 29, 2016, issued in counterpart Japanese Application No. 2012-279888.

Japanese Office Action (and English translation thereof) dated Sep. 8, 2016, issued in counterpart Japanese Application No. 2012-279029.

* cited by examiner

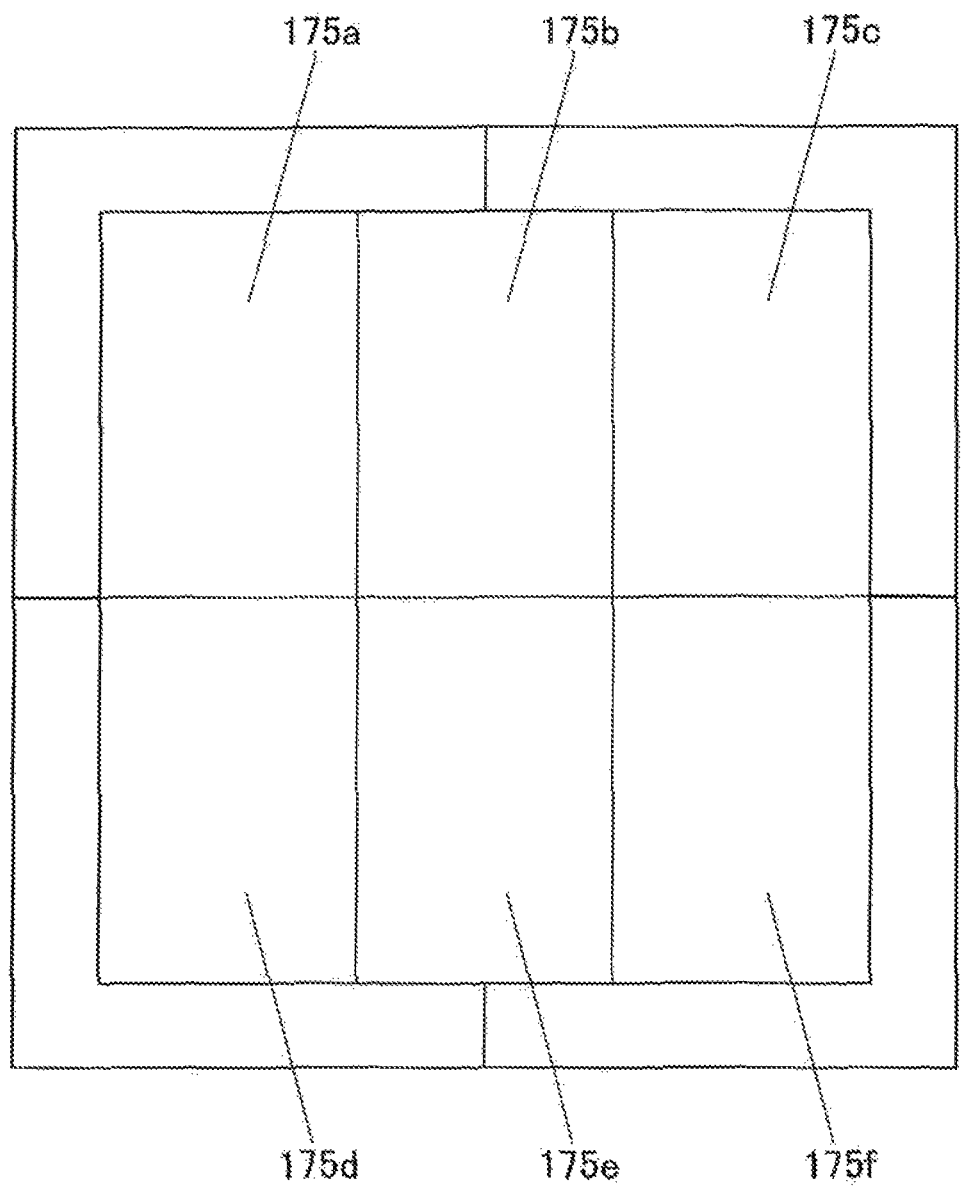

FIG. 10
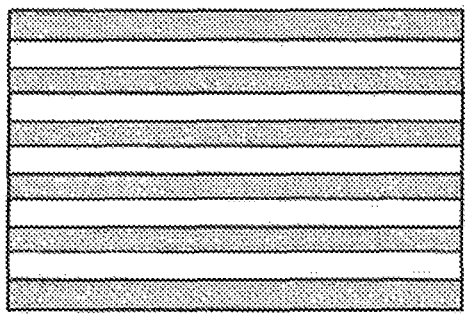
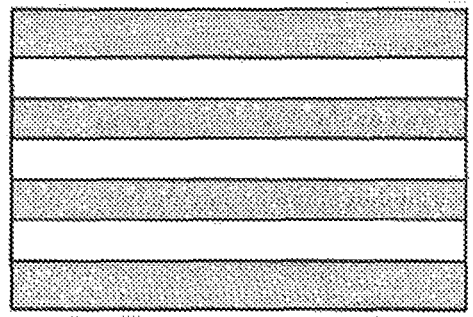
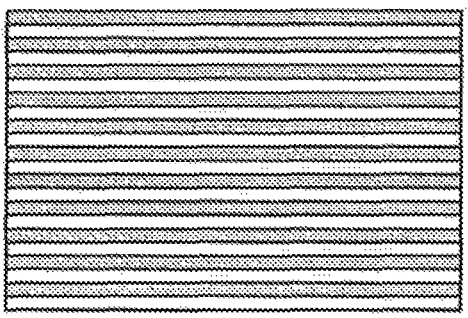
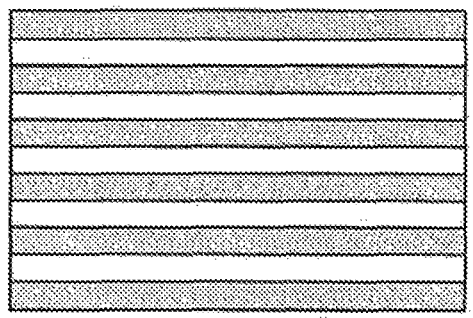

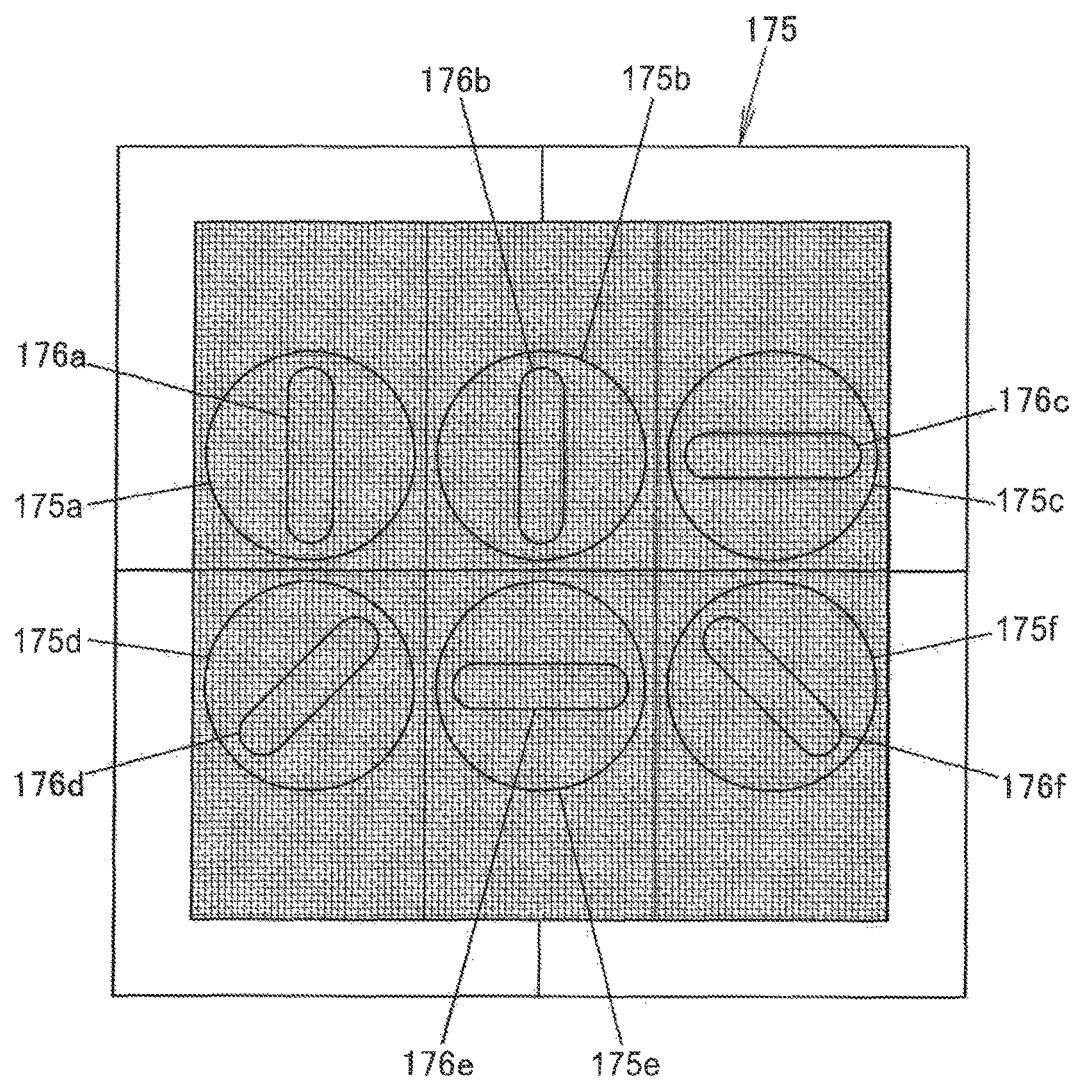

LIGHT SOURCE UNIT ABLE TO EMIT LIGHT WHICH IS LESS INFLUENCED BY INTERFERENCE FRINGES

CROSS-REFERENCE TO RELATED APPLICATION

This application is a Divisional application of U.S. Ser. No. 14/108,073 filed on Dec. 16, 2013, which is based upon and claims the benefit of priority under 35 USC 119 from the prior Japanese Patent Applications No. 2012-276548 filed on Dec. 19, 2012, No. 2012-279029 filed on Dec. 21, 2012 and No. 2012-279888 filed on Dec. 21, 2012, the entire contents of all of which are incorporated herein by reference.

BACKGROUND OF THE INVENTION

Field of the Invention

The present invention relates to a light source unit which is able to emit light which is less influenced by interference fringes and which is suitable for a projector.

Description of the Related Art

In these days, data projectors are used on many occasions as an image projection apparatus which projects images including an image of a screen and a video image of a personal computer, as well as images based on image data which is stored on a memory card on to a screen. In these data projectors, light emitted from a light source is caused to converge to a micromirror display element called a DMD (Digital Micromirror Device) or a liquid crystal panel so that a color image is displayed on a screen.

Conventionally, the mainstream of these projectors has been those which utilize a high-intensity discharge lamp as a light source. In recent years, however, there have been made many developments on using red, green and blue light emitting diodes or laser diodes, or solid light emitting elements using organic electroluminescence as light sources, and many proposals have been made.

Then, a light source unit which employs laser diodes can easily be made small in size and can constitute a small and high-intensity light source unit. However, in a projection image formed by laser beams, interference fringes are generated, and the interference fringes so generated deteriorate the quality of the projection image from time to time.

To cope with this problem, for example, the Japanese Unexamined Patent Publication (KOKAI) No. 2008-185628 (JP-2008-185628 A) proposes a light source unit including a combination of a dividing device which divides a wavefront which is emitted from a light source, a converting devise which rotates the plane of polarization of a bundle of light rays at the divided wavefront, and a combining device which superposes the wavefronts of the bundles of light rays of which the planes of polarization are oriented differently.

However, in this light source unit, the light emitted from the light source is once divided, and the planes of polarization of the light so divided are rotated and are thereafter superposed to be shone on to a predetermined plane, and therefore, the light source unit becomes complex and the production thereof is not easy.

SUMMARY OF THE INVENTION

The invention has been made in view of these situations and an object thereof is to provide a light source unit which can be configured as a small and high-intensity light source by using a plurality of light sources and with a simple construction and which is suitable for use in a projector.

With a view to achieving the object, according to a first aspect of the invention, there is provided a light source unit including:

a plurality of light sources which are semiconductor laser beam emitting elements;

a microlens array which includes a plurality of microlenses which are arranged planarly so that optical axes thereof are parallel to one another and which make uniform light beams emitted from the light sources individually; and a collective lens which collects the light beams from the light sources which are made uniform when they pass through the microlens array in such a way that the light beams are irradiated on a predetermined surface, wherein lens characteristics of the microlenses differ between areas on the microlens array on to which the light beams from the individual light sources are shone individually.

According to another aspect of the invention, there is provided a light source unit including a light source which includes a plurality of laser beam emitting elements, wherein the plurality of laser beam emitting elements are disposed such that an orientation of a light distribution of a laser beam emitted from one of the plurality of laser beam emitting elements differs from an orientation of light distributions of laser beams emitted from the other laser beam emitting element of the plurality of laser beam emitting elements.

According to a further aspect of the invention, there is provided a light source unit, including a plurality of light sources that light source elements which emit laser beams and collimator lenses which collect the laser beams emitted from the light source elements are combined therein, wherein pencils of light emitted from the light source elements are made to be collected in different collecting degrees between the light sources respectively.

BRIEF DESCRIPTION OF THE SEVERAL VIEWS OF DRAWINGS

Figure 2:
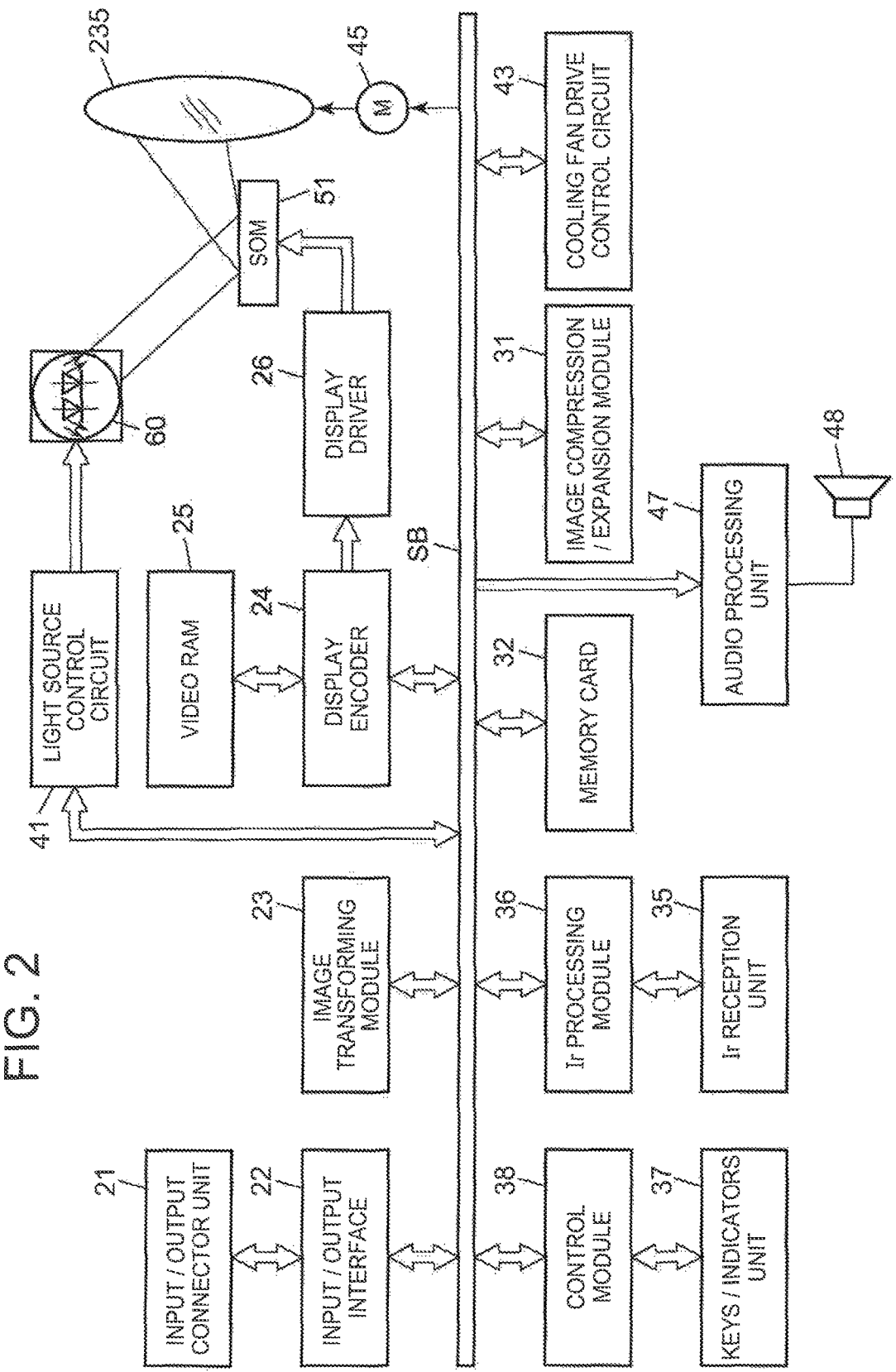
Figure 3:
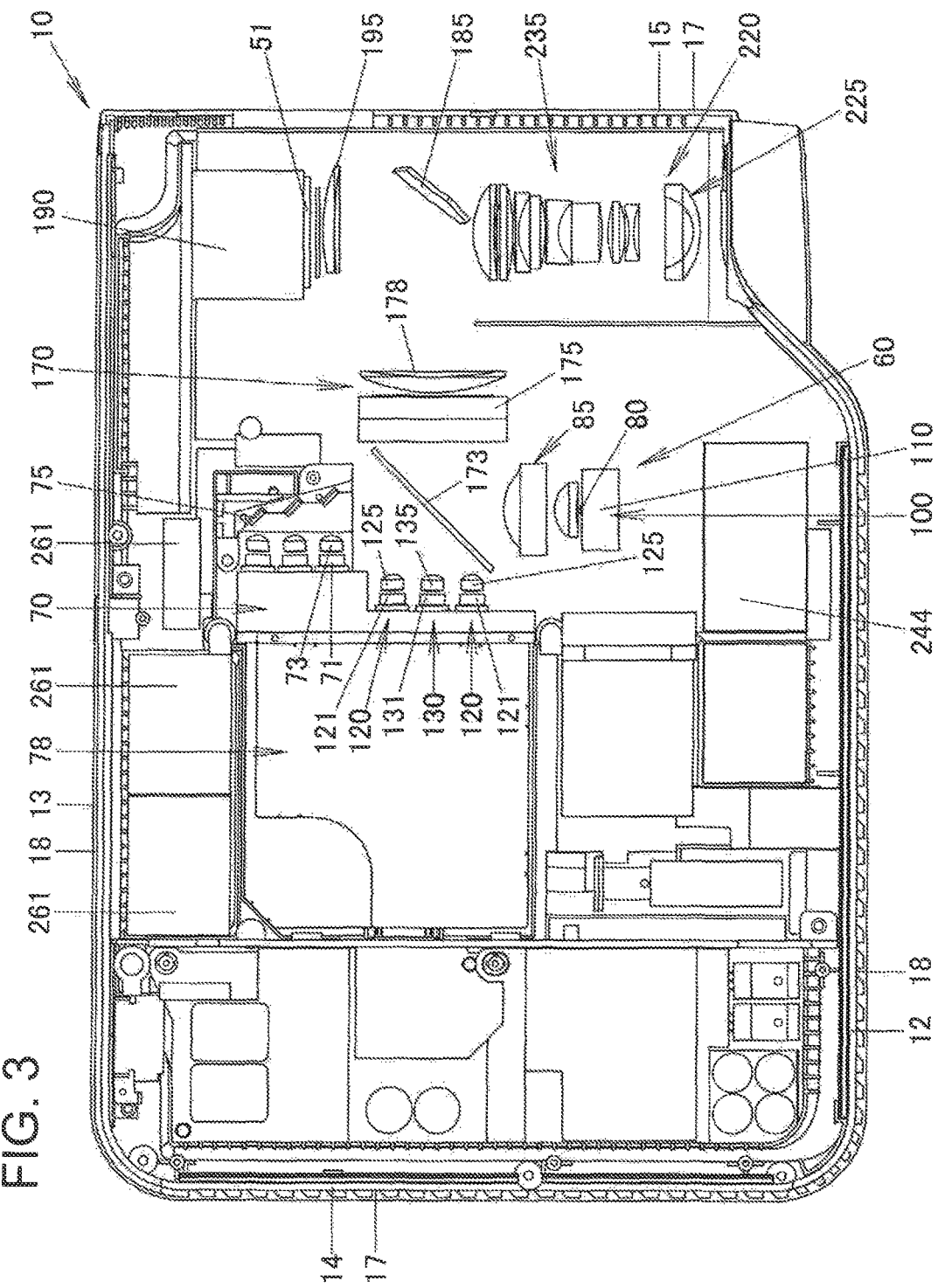
Figure 4:
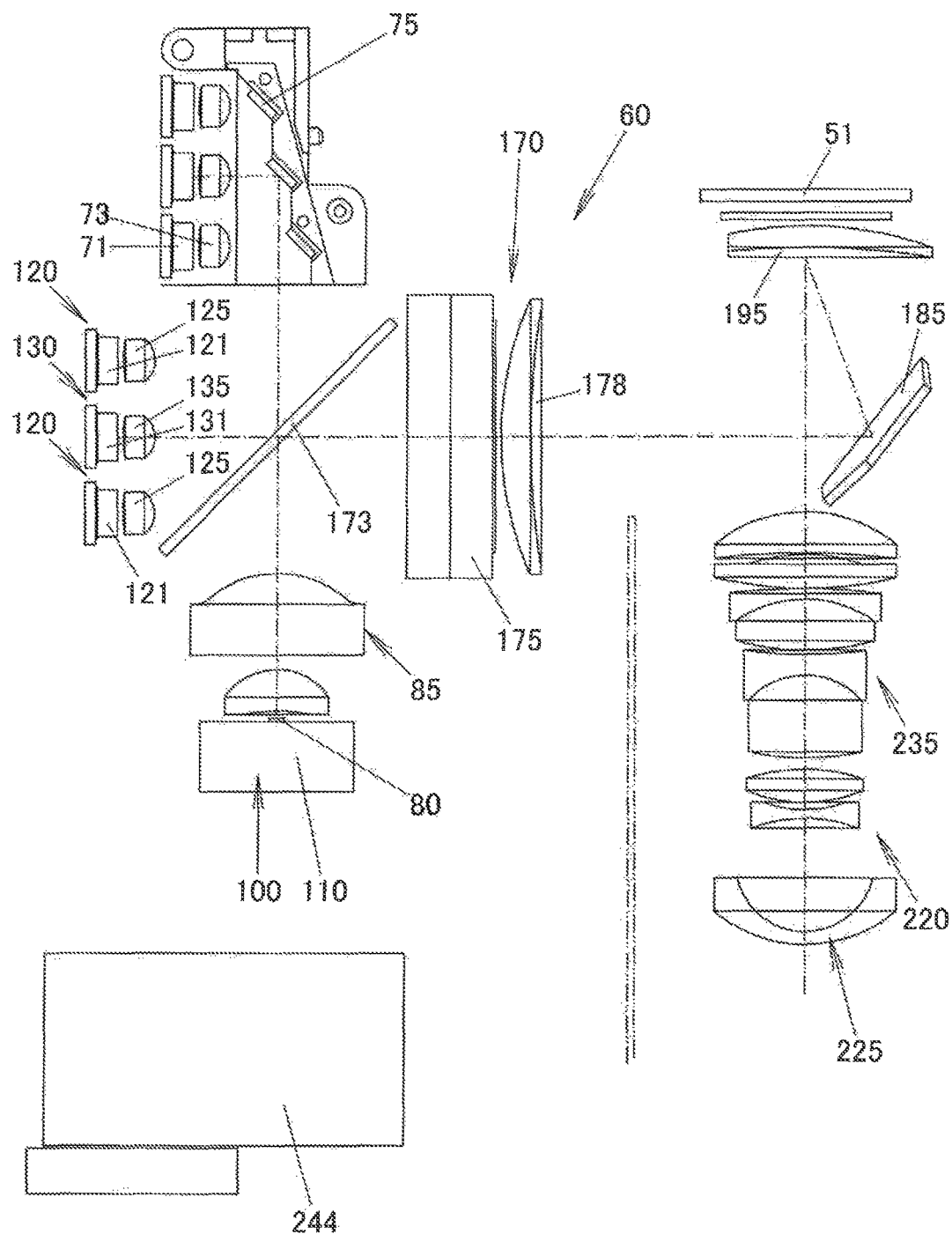
Figure 5:
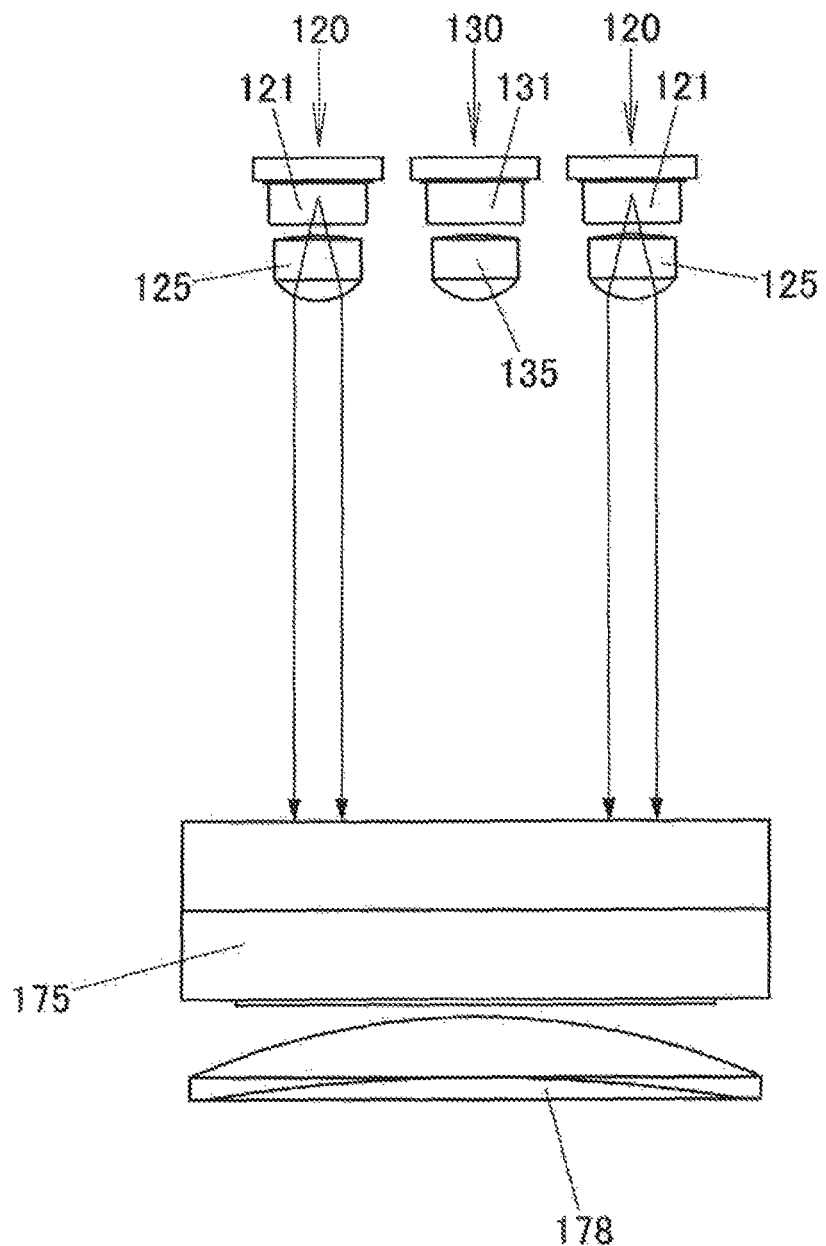
Figure 6:
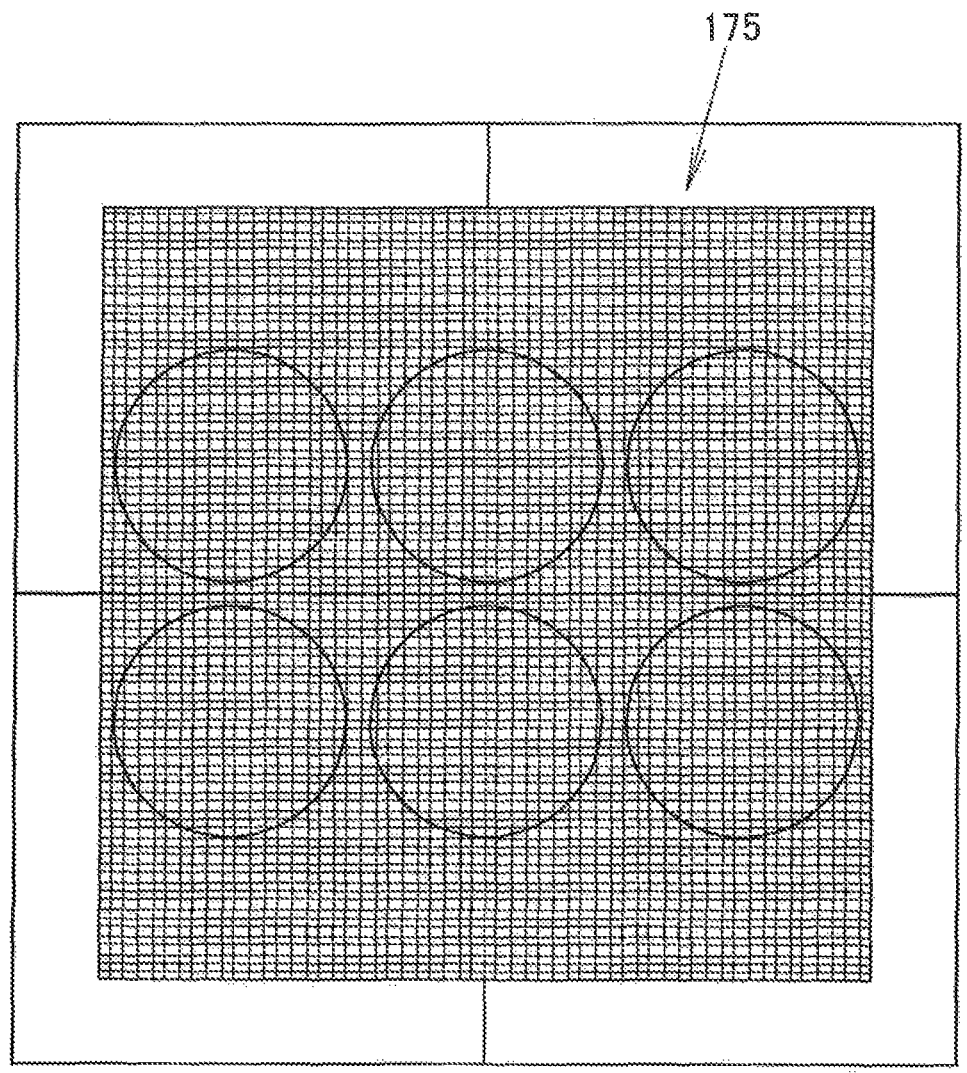
Figure 8A:
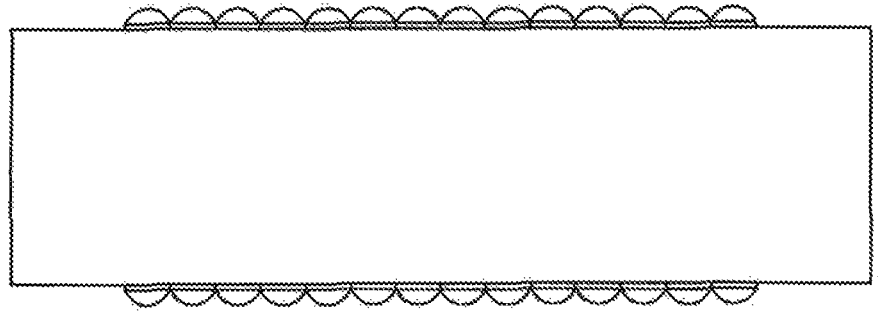
Figure 8B:
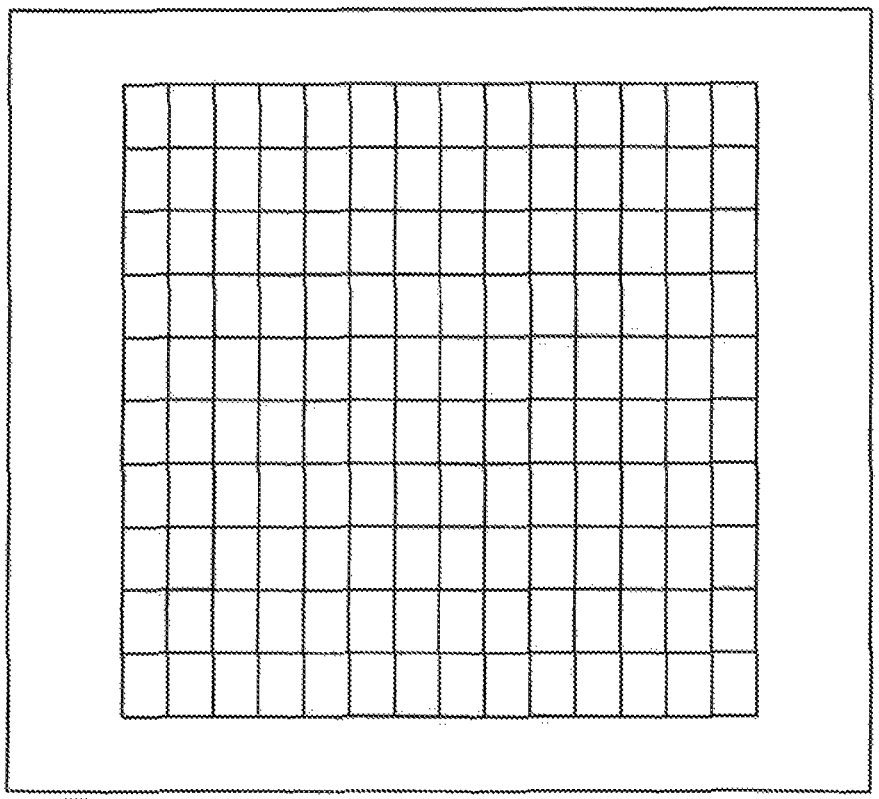

The above object and further objects, features and advantages of the invention will be obvious by referring to the following detailed description together with accompanying drawings, in which FIG. 1 is an external perspective view showing a projector according to an embodiment of the invention, FIG. 2 is a functional block diagram of the projector according to the embodiment of the invention, FIG. 3 is a schematic plan view showing an internal construction of the projector according to the embodiment of the invention, FIG. 4 is a schematic plan view showing an optical system of the projector according to the embodiment of the invention, FIG. 5 is a schematic diagram which explains one state of light source light in a light source unit of the projector according to the embodiment of the invention, FIG. 6 is an explanatory diagram regarding shining areas of laser light sources in the light source unit of the projector according to the embodiment of the invention, FIG. 7 is a schematic plan view showing areas of a microlens array according to the embodiment of the invention, FIG. 8A is a schematic plan view showing the microlens array according to the embodiment of the invention, and FIG. 8B is a schematic side view showing the same.

Figure 9:
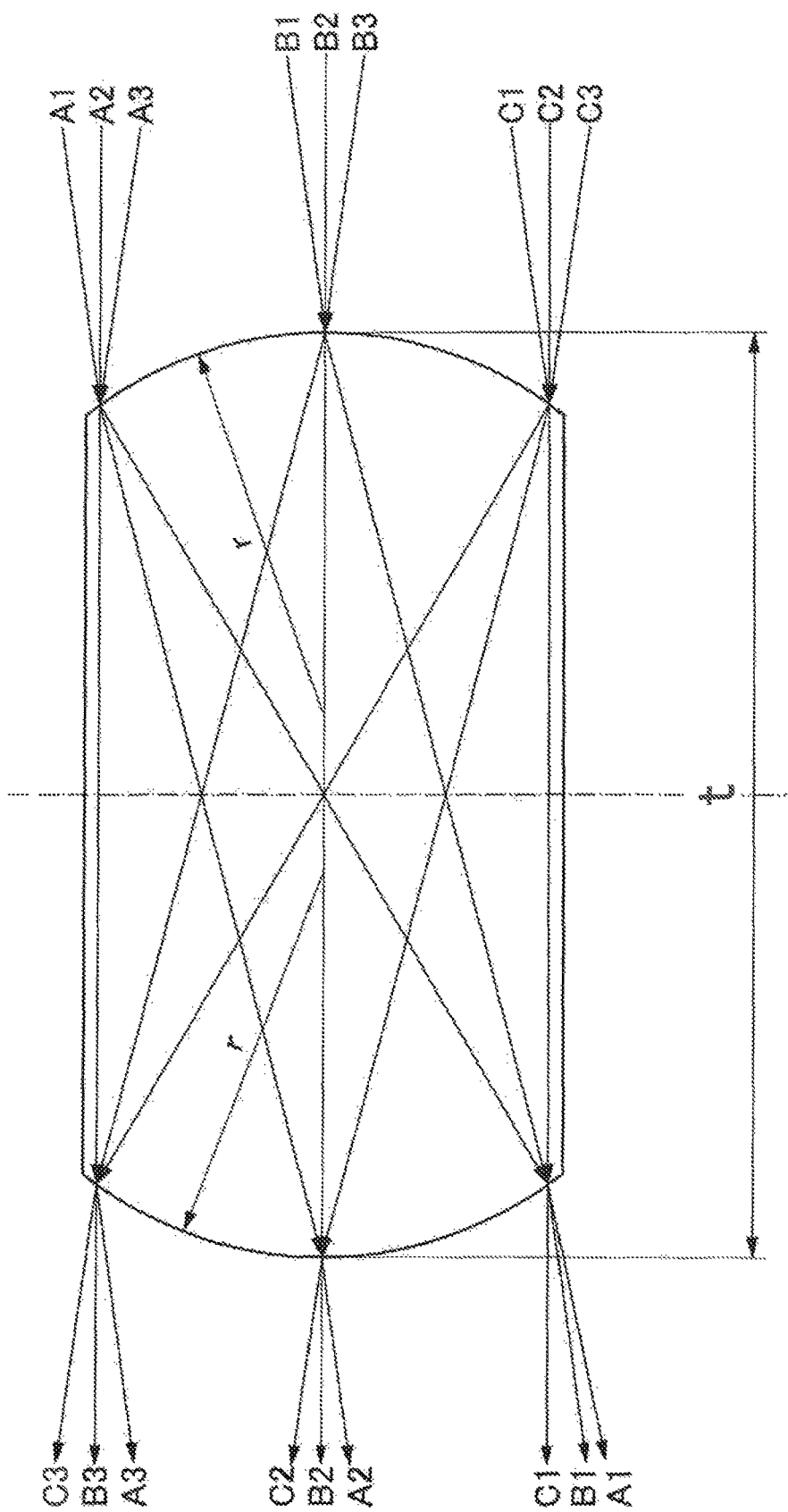
Figure 11:
Figure 12:
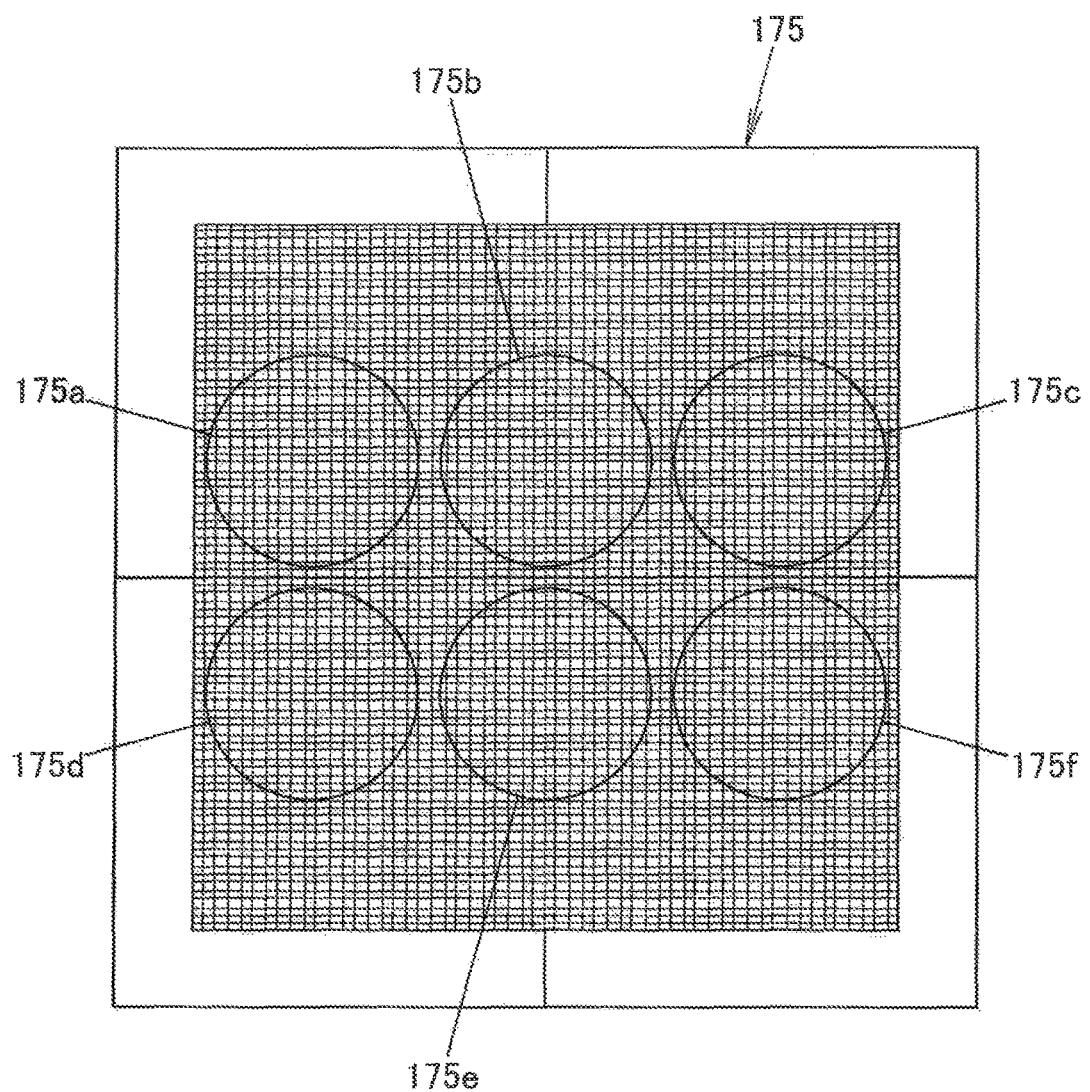
Figure 13:
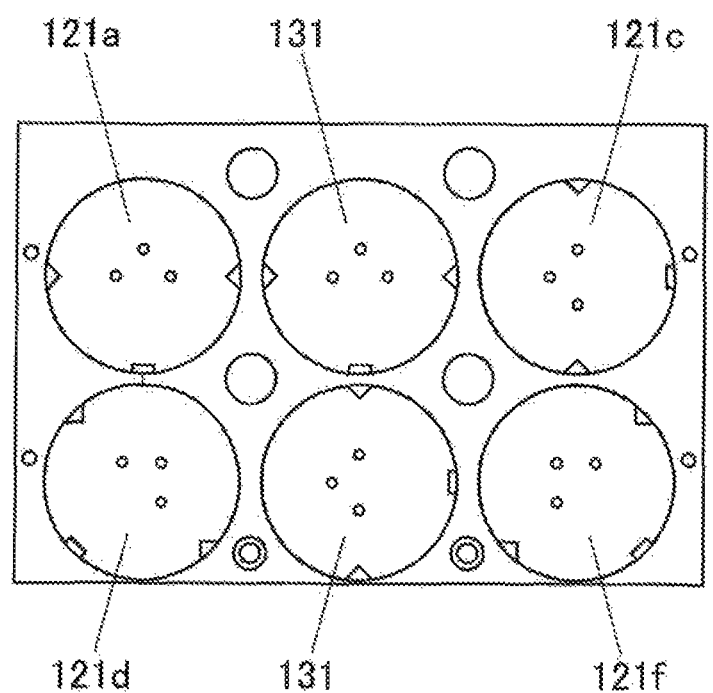
Figure 15A:
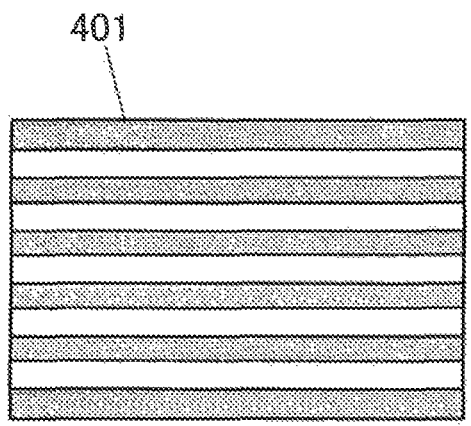
Figure 15B:
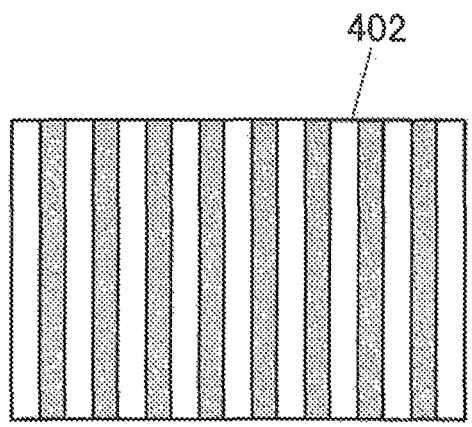
Figure 15C:
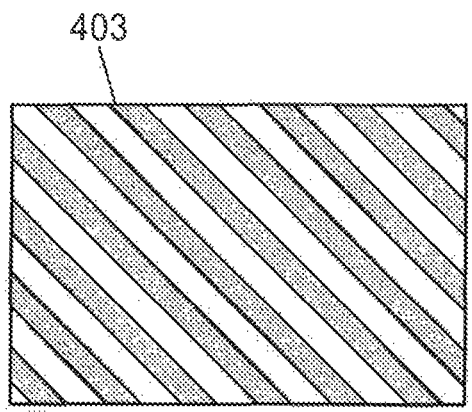
Figure 15D:
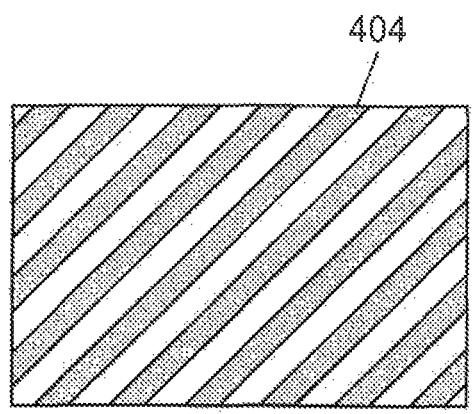
Figure 16:
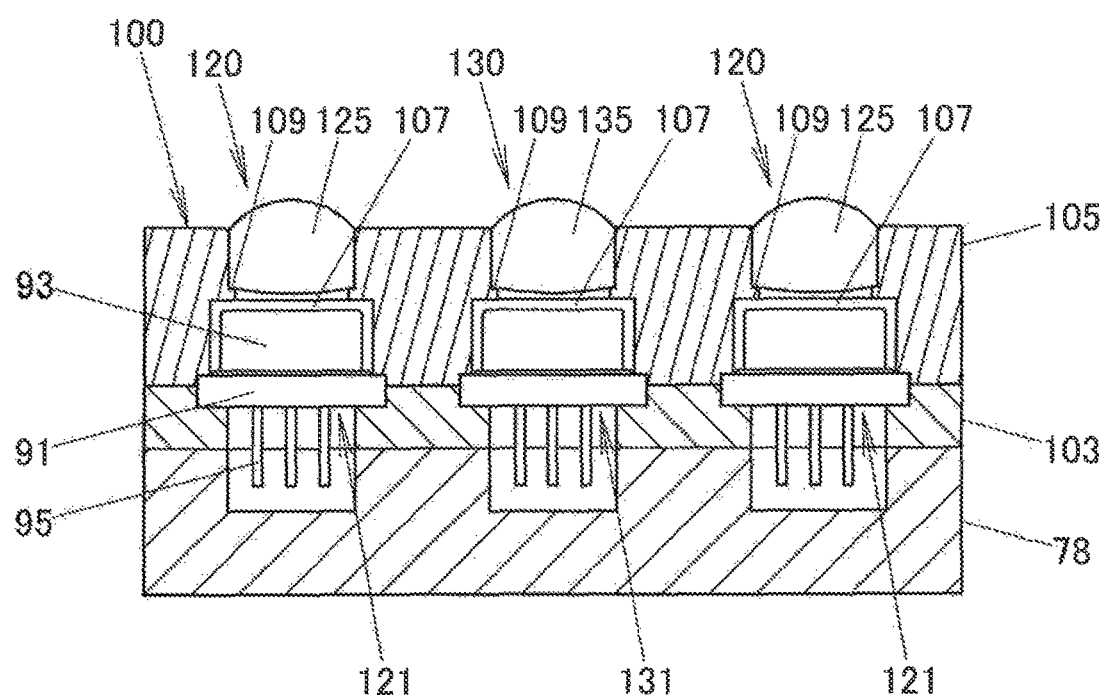
Figure 17A:
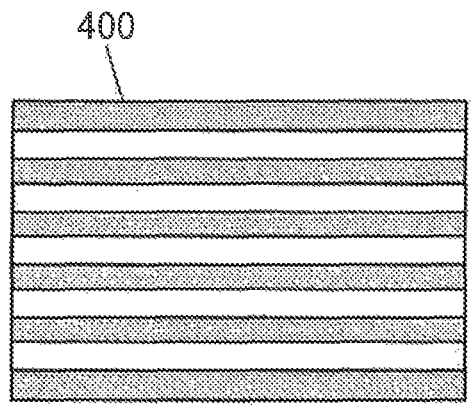
Figure 17B:
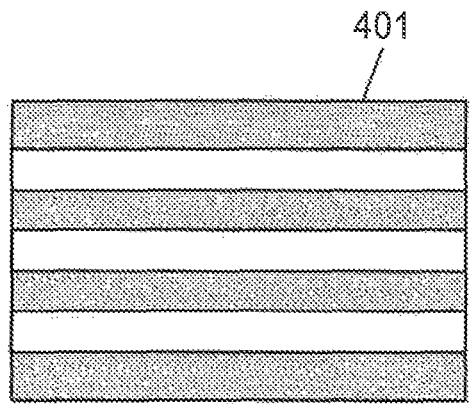
Figure 17C:
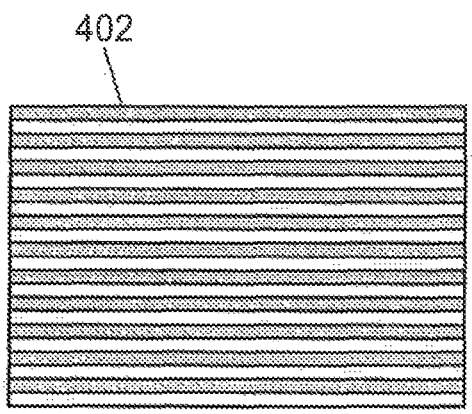
Figure 17D:
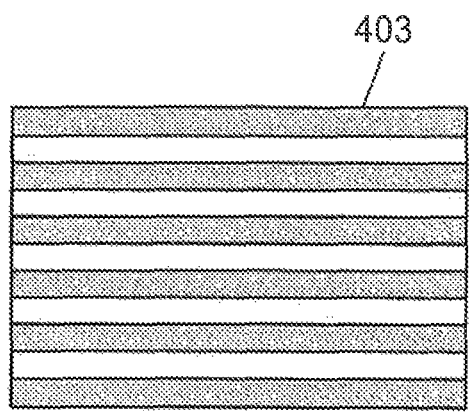

FIG. 9 is a schematic side view which explains a single lens which makes up the microlens array according to the embodiment of the invention, FIG. 10 is an explanatory diagram showing exemplarily respective interference fringes generated by light source devices according to the embodiment of the invention, FIG. 11 is an explanatory diagram showing exemplarily a projection screen of the projector according to the embodiment of the invention, FIG. 12 is an explanatory diagram regarding shining areas of laser light sources in a light source unit of a projector according to another embodiment of the invention, FIG. 13 is a diagram showing an arrangement of light sources according to the other embodiment of the invention, FIG. 14 is an explanatory diagram of light distribution characteristics of light from the light sources to a microlens array according to the other embodiment of the invention, FIGS. 15A to 15D are explanatory diagrams showing exemplarily interference fringes which are generated in an optical image by light from each of light emitting elements according to the other embodiment of the invention, FIG. 16 is a schematic sectional view showing an example of a construction of laser light sources in a light source unit of a projector according a further embodiment of the invention, and FIGS. 17A to 17D are explanatory diagrams showing exemplarily interference fringes which are generated in an optical image by light from each of light source devices according to the further embodiment of the invention.

DETAILED DESCRIPTION OF THE INVENTION

Hereinafter, a best mode for carrying out the invention will be described based on the drawings. However, although embodiments which will be described below will be given various limitations which are technically preferable to carry out the invention, the scope of the invention is not limited to embodiments and illustrations which will be given below.

A mode for carrying out the invention will be described below. FIG. 1 is an external perspective view of a projector 10. In this embodiment, when left and right are referred to with respect to the projector 10, they denote, respectively, leftward and rightward directions with respect to a projecting direction, and when front and rear are referred to with respect to the projector 10, they denote, respectively, forward and rearward directions of the projector 10 with respect to a direction towards a screen and the traveling direction of a pencil of light.

As is shown in FIG. 1, the projector 10 has a substantially rectangular parallelepiped shape. The projector 10 has a lens cover 19 which covers a projection port which is disposed to a side of a front panel 12 which is referred to as a front side panel of a projector casing. Additionally, a plurality of outside air inlet slits 18 are provided in the front panel 12. Further, although not shown, the projector 10 includes an Ir reception unit which receives a control signal from a remote controller.

In addition, a keys/indicators unit 37 is provided on an upper panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when the light source unit, the display element, a control circuit or the like overheats.

Further, provided in a back side or a back panel of the projector casing are an input/output connector unit where a USB terminals, a video signal input D-SUB terminal, an S terminal, an RCA terminal, a voice output terminal and the like are provided and various type of terminals 20 such as a power supply adaptor plug and the like. Additionally, a plurality of outside air inlet slits are formed in the back panel. A plurality of inside air outlet slits 17 are formed in each of a right panel, not shown, which is a side panel of the projector casing and a left panel 15 which is a side panel shown in FIG. 1. In addition, outside air inlet slits 18 are also formed in a portion of the left panel 15 which lies in a corner portion formed between the back panel and the left panel 15.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like. The control module 38 governs the control of respective operations of circuitries within the projector 10 and is made up of a CPU, a ROM which stores in a fixed fashion operation programs of various types of settings, a RAM which is used as a working memory and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display element control module and drives a display element 51, which is a spatial optical modulator (SOM), at an appropriate frame rate in response to the image signal outputted from the display encoder 24. Then, by driving the display element 51 by the display driver 26, in this projector 10, a pencil of light which is emitted from a light source unit 60 is shone onto the display element 51 to thereby form an optical image using reflected light which is reflected by the display element 51. The image so formed is then projected on to a screen, not shown, for display thereon via a projection-side optical system, which will be described later. In addition, a movable lens group 235 of the projection-side optical system is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium. Further, when in a reproducing mode, the image compression/expansion module 31 reads out image data recorded on the memory card 32 and expands individual image data which make up a series of dynamic images frame by frame. Then, the image data is outputted to the display encoder 24 via the image transforming module 23 so as to enable the display of dynamic images and the like based on the image data stored on the memory card 32.

Operation signals generated at the keys/indicators unit 37 which is made up of the main keys and indicators provided on the upper panel 11 of the projector casing are sent out directly to the control module 38. Key operation signals from the remote controller are received by the Ir reception unit 35, and a code signal demodulated at an Ir processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls the light source unit 60 so that light in predetermined ranges of wavelengths which is required when an image is generated is emitted from the light source unit 60. This light source unit 60 includes a green light source which is made up of an excitation light source device 70 which includes blue laser diodes and a luminous light emitting device 100 which includes a luminescent material plate, a red light source device 120 and a blue light source device 130.

Further, the control module 38 causes a cooling fan drive control circuit 43 to detect temperatures through a plurality of temperature sensors which are provided in the light source unit 60 and the like so as to control the rotating speed of cooling fans based on the results of the temperature detections. Additionally, the control module 38 also causes the cooling fan drive control circuit 43 to keep the cooling fan rotating even after the power supply to a projector main body is switched off by use of a timer or the like. Alternatively, the control module 38 causes the cooling fan drive control circuit 43 to cut off the power supply to the projector main body depending upon the results of the temperature detections by the temperature sensors.

Next, an internal construction of the projector 10 will be described. FIG. 3 is a schematic plan view showing an internal construction of the projector 10. As shown in FIG. 3, the projector 10 includes a control circuit board, not shown, in proximity to the right panel 14. This control circuit board includes a power supply circuit block, a light source control block and the like. Additionally, the projector 10 includes the light source unit 60 which lies to a side of the control circuit board, that is, in a substantially central portion of the projector casing.

As shown in FIG. 4, this light source unit 60 includes the green light source device, the red light source device 120, the blue light source device 130 and a shining optical system 170. The green light source device includes the excitation light source device 70 which is disposed near the center of the back panel 13 of the projector casing, the luminous light emitting device 100 which is disposed on an axis of a pencil of light which is emitted from the excitation light source device 70 and in proximity to the front panel 12 and a dichroic mirror 173 which is disposed between the excitation light source device 70 and the luminous light emitting device 100. The red light source device 120 is disposed between the excitation light source device 70 and the luminous light emitting device 100. The blue light source device 130 is disposed between the excitation light source device 70 and the luminous light emitting device 100. The shining optical system 170 includes a collective lens 178, a microlens array 175 and a shining mirror 185.

The excitation light source device 70 includes excitation light sources 71 which are semiconductor light emitting elements and which are disposed so that their optical axes are parallel to the back panel 13, a group of reflection mirrors 75 which each change an axis of light emitted from each of the excitation light sources 71 by 90 degrees in the direction of the front panel 12, and a heat sink 78 which is disposed between the excitation light sources 71 and the right panel 14.

The excitation light sources 71 are six blue laser diodes which are semiconductor laser beam emitting elements, and these six blue laser diodes are arranged into a matrix configuration of two rows and three columns. A collimator lens 73 is disposed on an optical axis of each of the blue laser diodes, and this collimator lens 73 is a collective lens which converts light emitted from each blue laser diode to parallel light. In addition, in the group of reflection mirrors 75, a plurality of reflection mirrors are arranged like steps in a staircase so as to narrow a sectional area of a pencil of light emitted from the excitation light source device 70 in one direction for emission to the luminous light emitting device 100.

Excitation light emitted from the excitation light source device 70 passes through the dichroic mirror 173 which transmits blue light and red light and reflects green light and further passes through a group of collective lenses 85 to be shone on to a luminescent material 80 which is formed as a luminous light emitting plate. Then, when the excitation light is shone on to the luminescent material 80, light in a range of green wavelengths is excited in the luminescent material 80 and is then emitted therefrom in every direction. The light in the green wavelength range so emitted travels directly towards the dichroic mirror 173 or, as will be described later, is reflected on a reflection surface on the side of a heat sink 110 which is disposed in front of the luminescent material 80 and is thereafter emitted towards the dichroic mirror 173. Then, the light in the green wavelength range which is emitted from the luminescent material 80 is reflected by the dichroic mirror 173 to be incident on the microlens array 175.

A cooling fan 261 is disposed between the heat sink 78 and the back panel 13, and the excitation light source device 70, the red light source device 120 and the blue light source device 130 are cooled by the cooling fan 261 and the heat sink 78. Further, a cooling fan 261 is also disposed between the group of reflection mirrors 75 and the back panel 13, and the group of reflection mirrors 75 are cooled by this cooling fan 261.

The luminous light emitting device 100 includes the plate which is disposed so as to be parallel to the front panel 12, that is, the plate of the luminescent material 80 which is disposed so as to intersect at the right angles with an axis of light emitted from the excitation light source device 70, the group of collective lenses 85 which collects excitation light which is shone on to the plate of the luminescent material 80 and luminous light which is emitted from the luminescent material 80, and the heat sink 110. It is noted that the reflection surface which reflects light is formed on one side surface of the heat sink 110 by mirror finishing the side surface through silver deposition or the like, and the plate of the luminescent material 80 is disposed on the reflecting surface. Further, a cooling fan 244 which is a cooling device is disposed on a front panel 12 side of the luminous light emitting device 100, and the heat sink 110 of the luminous light emitting device 100 is cooled by this cooling fan 244.

The red light source device 120 includes red light sources 121 which are disposed so that their optical axes are at right angles to the axis of excitation light which is incident on the luminous light emitting device 100, and collimator lenses 125 which collect light emitted from the red light sources 121. Additionally, the red light sources 121 are red laser diodes which are semiconductor laser beam emitting elements which emit light in a range of red wavelengths, and four red laser diodes are arranged vertically and horizontally.

Then, as with the light in the green wavelength range which is emitted from the luminous light emitting device 100 and then is reflected by the dichroic mirror 173, light in the red wavelength range which is shone by the red light source device 120 passes through the dichroic mirror 173 and is then incident on the microlens array 175 of the shining optical system 170.

Additionally, the blue light source device 130 also includes blue light sources 131 which are disposed so that their optical axes are at right angles to the axis of excitation light which is incident on the luminous light emitting device 100 and collimator lenses 135 which collect light emitted from the blue light sources 131 and are disposed so as to be aligned with the red light source device 120. Additionally, the blue light sources 131 are blue laser diodes which are semiconductor laser beam emitting elements which emit light in a range of blue wavelengths, and two blue laser diodes are arranged vertically.

Then, as with the light in the green wavelength range which is emitted from the luminous light emitting device 100 and then is reflected by the dichroic mirror 173, light in the blue wavelength range which is shone by the blue light source device 130 passes through the dichroic mirror 173 and is then incident on the microlens array 175 of the shining optical system 170.

A heat sink 190 is disposed between the display element 51 and the back panel 13, and the display element 51 is cooled by this heat sink 190. Additionally, a condenser lens 195 is disposed in proximity to a front side of the display element 51, and this condenser lens 195 causes light from the shining mirror 185 of the shining optical system 170 to be incident on the display device 51 which is the DMD at an appropriate angle and causes "on" light which is reflected by the display element 51 so as to be emitted therefrom to be incident on the projection-side optical system 220.

A group of lenses of the projection-side optical system 220 projects the "on" light which is reflected on the display element 51 on to a screen. The projection-side optical system 220 is formed into a variable-focus lens with a zooming function which includes a group of fixed lenses 225 which is incorporated in a fixed barrel and the group of movable lenses 235 which is incorporated in a movable lens barrel. Then, a zooming control and a focusing control can be executed by moving the group of movable lenses 235 by the lens motor.

A state of light of the optical system in the light source unit 60 will be described in detail by using FIGS. 5 to 6. Red light from each of the red laser diodes (FIG. 5 showing two red laser diodes in the same row in the four red laser diodes provided) which are the four red light sources 121 which make up the red light source 120 is converted into a substantially parallel pencil of light by the corresponding collimator lens 125 to be incident on the microlens array 175.

Additionally, blue light from each of the blue laser diodes (FIG. 5 showing one of the two blue laser diodes provided which is aligned with the aforesaid two red laser diodes in the same row) which are the two blue light sources 131 which make up the blue light source device 130 is converted into a substantially parallel pencil of light by the corresponding collimator lens 135 to be incident on the microlens array 175.

Because of this, as shown in FIG. 6, laser beams from the red light sources 121 and the blue light sources 131 pass through the dichroic mirror 173 and is then shone on to the microlens array 175 at right angles in such a manner that pencils of light from the individual light sources are shone on to different areas on the microlens array 175 which match the respective positions of the light sources which are arranged in the way described above.

In addition, in the green light source device, laser beams from the individual excitation light sources 71 of the excitation light source device 70 are each converted into a substantially parallel pencil of light by the corresponding collimator lens 73, and pencils of light which are emitted from the individual excitation light sources 71 are made parallel to each other. Then, these pencils of light pass through the dichroic mirror 173 and are collected by the group of collective lenses 85 to be shone on to the luminescent material 80. Thus, luminous light is generated from the luminescent material 80.

Then, the luminous light emitted from the luminescent material 80 is converted into a substantially parallel pencil of light by the group of collective lenses 85 and is then reflected by the dichroic mirror 173 to be incident perpendicularly on substantially the whole surface of the microlens array 175.

(First Embodiment)

Hereinafter, a first embodiment of the invention will be described.

As shown in FIG. 7, a microlens array 175 is divided into a first area 175a to a sixth area 175f so as to match the numbers of red light sources 121 and blue light sources 130 which shine laser beams on to the microlens array 175 and the positions of incident beams from the individual semiconductor laser beam emitting elements, and lens characteristics of a plurality of microlenses within one area are made to differ from those of a plurality of microlenses within the other areas with one another.

In addition, the lens characteristic (focal length) of each microlens is determined by the thickness "t" of the microlens which is a thick lens, the radii of radius curvatures "r" of convex surfaces on an entrance side and an exit side of the microlens, and the refractive index of the microlens based on the material thereof, and the state of light emitted therefrom changes depending upon the lens characteristic.

The microlens array 175 is formed by forming spherical convex portions in corresponding positions on both surfaces of a thick transparent plate as shown in FIG. 8A, cutting circumferential edges of resulting biconvex lenses so that they are cut apart from one another as a number of rectangular biconvex lenses, and arranging these rectangular biconvex lenses vertically and horizontally so as to lie adjacent to one another as shown in FIG. 8B. Each of these biconvex lenses constitutes the microlens. As shown in FIG. 9, in each of the microlenses of the microlens array 175, the whole of light incident on the convex portion of the entrance surface of the microlens at an angle falling within a predetermined angular range with respect to the normal to the surface of the microlens array 175 is emitted in a diffused fashion from the convex portion on the exit surface side of the microlens which is situated in a position corresponding to the convex portion of the entrance surface of the microlens where the light is incident.

In addition, even though each rays of light incident on each microlenses are parallel with one another when they are individually incident onto each microlenses, the light is diffused when it is emitted from the microlens and is then superposed on diffused light which passes through the other microlenses, so that all the light becomes uniform and is collected to a surface of the display element 51 which is a predetermined surface in a superposed fashion by the collective lens 178.

Because of this, even though pencils of light which are incident on the microlens array 175 within the range of the predetermined area are uneven in light density, and hence, quantities of light incident on the individual microlenses lying within the range where the pencils of light are incident differ from one another, by superposing the light emitted from the individual microlenses at the predetermined surface by the collective lens 178, the illuminance at the predetermined surface by the light which passes through the microlens array 175 can be made even as a whole.

Further, when laser beams are incident on the shining optical system 170, interference fringes are generated in the laser beams shone on to the surface of the display element 51 which constitutes the predetermined surface, and when a plurality of semiconductor laser beam emitting elements are used as light sources, interference fringes having a constant width result due to the wavelengths of the laser beams. Because of this, even though the plurality of red laser diodes and blue laser diodes are used, in the shining optical system 170, interference fringes generated in the laser beams of the same color have the same pitches, and when interference fringes of the same pitches are superposed, the quality of a projection image is deteriorated by the interference fringes which are arranged constantly at a predetermined pitch.

Because of this, in this embodiment, in the first area 175*a*, the third area 175*c*, the fourth area 175*d* and the sixth area 175*f* which constitute the four areas on the microlens array 175 on which laser beams from the four red light sources 121 are incident, the thickness "t" of the plurality of microlenses which are thick biconvex lenses or the radius of curvature "r" thereof in one area is made to differ from that of the plurality of microlenses in the other areas. As a result of this, as shown in FIG. 10, interference fringes generated by red light which passes through the first area 175*a*, interference fringes generated by red light which passes through the third area 175*c*, interference fringes generated by red light which passes through the fourth area 175*d* and interference fringes generated by red light which passes through the sixth area 175*f* come to have different pitches.

Consequently, by causing laser beams from the four red light sources 121 to pass through the microlens array 175 in which the different areas have the different lens characteristics to be superposed one on another at the predetermined surface by the collective lens 178, it becomes difficult to identify the interference fringes in a projection image plane as shown in FIG. 11 due to the difference in brightness or darkness between the individual interference fringes generated by the laser beams from the four red light sources 121, as a result of which the quality of the projection image can be enhanced.

In addition, in the second area 175*b* and the fifth area 175*e* on which laser beams from the two blue light sources 131 is incident, the thickness "t" of the microlenses or the radius of curvature "r" thereof in one area is made different from that in the other area, whereby a different in pitch is provided between interference fringes generated by the laser beams from the two blue light sources 131.

It is noted that in the microlens array 175, all microlenses in each of the six areas of the first area 175*a* to the sixth area 175*f* are given the same thickness "t" and the same radius of curvature "r" so that all microlenses within each of the predetermined areas 175*a* to 175*f* have the same lens characteristics.

Additionally, in this embodiment, the thicknesses "t" or the radii of curvature "r" of the microlenses are made to differ between the areas. However, the invention is not limited to the microlens array 175 which is formed entirely of the single thick transparent plate having the convex portions formed on both the surfaces thereof. For example, transparent plates which are made of different materials are prepared individually for the areas, and glass materials having different refractive indexes are used individually for the areas. Thus, microlenses having the same lens characteristics based on a refractive index provided by one material used are prepared for one microlens array for one area. Similarly, microlens arrays having different lens characteristics based on materials used are prepared for the remaining areas. Then, the microlens arrays prepared for the different areas are arranged together to make up a single microlens array 175 having a first area 175*a* to a sixth area 175*f*. Thus, even with the same thickness "t" or radius of curvature "r" given to all the constituent microlenses of the single microlens array 175, the same advantage provided by the microlens array 175 made up of the microlenses whose thickness "t" or radius of curvature "r" is made to differ between the first to sixth areas 175*a* to 175*f* is achieved by the single microlens array 175 which is made up by arranging the microlens arrays together each of which has different lens characteristics with one another owing to different refractive indexes caused by different glass materials.

Further, the invention is not limited to the case where the focal lengths of the microlenses are made to differ between the areas by making the thicknesses "t" or radii of curvature "r" of the microlenses differ between the areas or the case where the focal lengths of the microlenses are made to differ between the areas by making the refractive indexes of the glass materials used differ between the areas. For example, the pitch of the microlenses is made to differ so that the sizes of individual microlenses are made to differ between the areas, whereby the microlenses are made to differ in brightness, which is one of lens characteristics, between the areas.

When laser beams are caused to pass through the microlens array 175 in which the lens characteristics of the constituent microlenses are made to differ in the way described above and are then collected to the surface of the display element 51 which constitutes the predetermined surface via the collective lens 178 and the like, interference fringes which are generated by the laser beams which pass through the different areas of the microlens array 175 come to have different pitches, and the shining areas which are formed on the predetermined surface by the laser beams which pass through the different areas come to differ.

In addition, in the light source unit 60 which includes the shining optical system 170 which includes the microlens array 175, the collective lens 178 and the like, it is normal practice to determine, as a reference value of a shining area in the position of the predetermined surface, a range which is wider, for example, by on the order of 10% as a predetermined magnification in an area ratio than a surface area of an effective display area which is a micromirror surface of the display element 51, so that light source light can easily be shone on to all of micromirrors of the display element 51.

Because of this, the light source light is shone additionally on to the periphery of the micromirror surface of the display element 51. In this embodiment, as with the conventional practice, the reference value is set so that the range which is wider by on the order of 10% than the surface area of the display effective area is shone by the laser beam. In addition, when the shining areas on the individual areas by the laser beams change from the reference value so set due to a change in lens characteristics of the microlenses, a reduction in a minimum shining area by the change in the shining areas is allowed to stay within a range of less than 10% of the area set as the reference value to thereby change the width of interference fringes.

In this way, by setting the reference value as the area which is wider by 10% than the mirror area of the display element 51 and allowing the decreasing variation in shining area by the lens characteristics to stay within the range of less than 10% of the reference value, even when the shining area by the light which passes through the predetermined areas of the microlens array 175 becomes minimum, the light can be shone on to all the surfaces of the micromirrors of the display element 51 so as to form a projection image in an ensured fashion.

Consequently, in this embodiment, in the microlens array 175 where light emitted from the light sources of the light source unit 60 is made uniform, the lens characteristics of the microlenses are made to differ between the areas where the light from the individual light sources is shone so as to make patterns of the interference fringes formed by the laser beams emitted from the individual light sources differ between the areas. Then, when the laser beams from the individual light sources are superposed one on another on the plane in the predetermined position, the number of levels of brightness or darkness of the interference fringes is increased and spaces defined between the interference fringes are narrowed, whereby the interference fringes can be made less conspicuous.

In addition, in the projector 10 employing the light source unit 60, the quality of a projection image can be enhanced by making the fringe patterns in the projection image less conspicuous.

Additionally, in the microlens array 175, when the thickness "t" or radius of curvature "r" of the microlenses is made to differ between the areas, the microlens array 175 can easily be produced, and the lens characteristics of the microlenses can easily be made to differ between the areas, therefore, it becoming easy to make the interference fringes less conspicuous.

Further, in the microlens array 175, it is extremely easy to make the pitch of the microlenses differ between the areas, whereby the lens characteristics of the microlenses can easily be made to differ between the areas, therefore, it becoming easy to make the interference fringes less conspicuous.

Furthermore, in the single microlens array 175, the single microlens array 175 which has the refractive indexes which differ between the areas can easily be produced by arranging together the microlens arrays which are made of the different glass materials, and the lens characteristics of the microlenses can easily be made to differ between the areas, therefore, it becoming easy to make the interference fringes less conspicuous.

In addition, when the shining ranges on the predetermined surface come to differ as the result of the lens characteristics being made to differ between the areas, in the event that the range where the shining area changes is controlled by providing the reference value for the shining area, the setting becomes easy in making the lens characteristics differ between the areas, and hence, the interference fringes can easily be changed largely without reducing the illuminance of the surface shone by the laser beams.

(Second Embodiment)

Hereinafter, a second embodiment of the invention will be described.

It is noted that a projector according to an invention of the second embodiment is the same as the projector 10 which has been described above by reference to FIGS. 1 to 6.

FIG. 12 is a schematic front view of a microlens array 175 showing that light emitted from individual light sources in a light source unit which is employed in the projector 10 according to the second embodiment is shone on to shining areas of the microlens array 175.

Red light from red laser diodes (FIG. 5 showing two red laser diodes in the same row in four red laser diodes provided) which are four red light sources 121 which make up a red light source 120 is converted into substantially parallel pencils of light by a group of collimator lenses 125 to be incident on predetermined shining areas of the microlens array 175 of a shining optical system 170 which is positioned in front of the red light source 120. This configuration is the same as that of the first embodiment.

Additionally, blue light from blue laser diodes (FIG. 5 showing one of two blue laser diodes provided which is aligned with the aforesaid two red laser diodes in the same row) which are two blue light sources 131 which make up a blue light source device 130 which is sandwiched on both sides thereof by the red light sources 121 of the red light source device 120 is converted into substantially parallel pencils of light by a group of collimator lenses 135 to be incident on predetermined shining areas of the microlens array 175 which is positioned in front of the blue light source device 130. This configuration is the same as that of the first embodiment.

Because of this, laser beams from the red light sources 121 and the blue light sources 131 pass through a dichroic mirror 173 and are incident on the microlens array 175 at right angles in such a manner that pencils of light from the individual light sources are shone on to different areas on the microlens array 175 which match the respective positions of the light sources which are arranged in the way described above, as shown in FIG. 12. It is noted that in FIG. 12, a first area 175a, a third area 175c, a fourth area 175d and a sixth area 176f denote spots for laser beams shone from the red light sources 121, and a second area 175b and a fifth area 175e denote spots for laser beams shone from the blue light sources 131.

In addition, in a green light source device, laser beams from individual excitation light sources 71 of an excitation light source device 70 are each converted into a substantially parallel pencil of light by corresponding collimator lens 73, and pencils of light which are emitted from the individual excitation light sources 71 are made parallel to each other. Then, these pencils of light pass through the dichroic mirror 173 of the shining optical system 170 and are collected by a group of collective lenses 85 to be shone on to a luminescent material 80. Thus, luminous light is generated from the luminescent material 80.

Then, the luminous light emitted from the luminescent material 80 is converted into a substantially parallel pencil of light by the group of collective lenses 85 and is then reflected by the dichroic mirror 173 to be incident perpendicularly on substantially the whole surface of the microlens array 175. This configuration is the same as that of the first embodiment.

Consequently, as shown in FIG. 12, the first area 175a to the sixth area 175f are formed on the microlens array 175 of the shining optical system 170 so as to match the numbers of red light sources 121 and blue light sources 130 which shine laser beams on to the microlens array 175 and the positions of incident light from the individual semiconductor laser beam emitting elements.

In the microlens array 175, a plurality of microlenses are formed into a grating-like configuration, and these microlenses are thick lenses which are made up of a plurality of fine convex portions which are formed on both surfaces of a light transmitting portion. Optical axes of the microlenses are parallel to each other. Light emitted from the individual light sources is divided by the microlens array 175, and the shape of each divided light is converted into a shape which matches the shape of a display area of a display element 51 which constitutes a predetermined surface.

In the shining optical system 170, light incident on respective entrance surfaces of the shining areas of the microlens array 175 is collected to be superposed on a surface of the display element 51 which constitutes the predetermined surface.

When laser beams are incident on the microlens array 175 of the shining optical system 170, interference fringes are generated on the surface of the display element 51 which constitutes the predetermined surface. Then, when a plurality of semiconductor laser beam emitting elements are used as light sources, interference fringes come to have a constant width according to the wavelengths of the laser beams. Because of this, in the shining optical system 170, even though pluralities of red laser diodes and blue laser diodes are used so as to combine them together, interference fringes formed by laser beams of the same color have the same pitch. Then, when interference fringes having the same pitch are superposed, the quality of a projection image is deteriorated by the resulting interference fringes which are arranged constantly at the predetermined pitch. In particular, the red light emitted from the red light sources 121 which are provided more than the blue light sources 131 tends to uncomfortably influence the eyes of a viewer more than the blue light emitted from the blue light sources 131.

Because of this, in this embodiment, the interference fringes which are generated in the first area 175a, the third area 175c, the fourth area 175d and the sixth area 175f of the microlens array 175 on which laser beams from the four red light sources 121 are incident are configured so as to be oriented in a different direction.

Namely, a semiconductor laser holds high directivity and has a polarization characteristic provided by a difference in distortion introduced into an active layer. For example, when a laser beam is oscillated parallel to a joining plane, an elliptic light distribution pattern is obtained. FIG. 13 is a diagram showing an arrangement of individual light sources according to this embodiment of the invention. As shown in FIG. 13, in the group of laser light sources, the four red light sources 121a, 121c, 121d, 121f are disposed in four corners, and the red light source 121a is referred to as a reference light source or laser beam emitting element. Then, the four red light sources 121a, 121c, 121d, 121f are disposed in such a way that the laser beam emitting elements thereof are rotated sequentially about axes of laser beams emitted therefrom through different angles which are multiples of an angle resulting from dividing equally 180 degrees by the number of laser beam emitting elements with respect to the angle at which the reference laser beam emitting element is disposed so that the elliptic light distribution patterns formed by the laser beam emitting elements are oriented differently.

For example, with respect to the angle at which the red light source 121a is disposed, the red light source 121f is fixed in a position where it is rotated through 45 degrees in a counterclockwise direction, the red light source 121c is fixed in a position where it is rotated through 90 degrees in the counterclockwise direction, and the red light source 121d is fixed in a position where it is rotated through 135 degrees in the counterclockwise direction. In addition, the two blue light sources 131 which are positioned centrally are also fixed in positions where they are rotated through different angles in a similar fashion.

FIG. 14 is an explanatory diagram which illustrates light distribution characteristics or patterns formed on the microlens array according to the embodiment of the invention by laser beams emitted from the individual light sources. The figure shows orientations of the light distribution patterns formed by the laser beams emitted from the individual light sources on the first area 175a, the second area 175b, the third area 175c, the fourth area 175d, the fifth area 175e and the sixth area 175f of the microlens array 175. Laser beams from the red light sources 121 which are disposed at the angular intervals of 45 degrees as shown in FIG. 13 form elliptic light distribution patterns 176a, 176c, 176d, 176f which are oriented differently as a result of the arrangement of the laser beam emitting elements. Additionally, laser beams from the blue light sources 131 also form elliptic light distribution patterns 176b, 176e which are oriented differently.

In this way, for example, red laser beams which are incident on the microlens array 175 form the elliptic light distribution patterns which are rotated about the axes of the corresponding laser beams at the angular intervals of 45 degrees. FIGS. 15A to 15D are explanatory diagrams which illustrate interference fringes generated in optical images formed by the laser beams from the laser beam emitting elements according to this embodiment of the invention.

FIGS. 15A to 15D show that bright areas and dark areas are formed at equal intervals in optical images, whereby interference fringes are formed in the optical images. As shown in FIG. 15A, interference fringes 401 generated by a laser beam which passes through the first area 175a are horizontal. Interference fringes 402 generated by a laser beam which passes through the third area 175c are vertical, as shown in FIG. 15B. Interference fringes 403 generated by a laser beam which passes through the fourth area 175d are oriented in a direction in which they are rotated through 45 degrees in the counterclockwise direction, as shown in FIG. 15C. Interference fringes 404 generated by a laser beam which passes through the sixth area 175f are interference fringes which are oriented in a direction in which they are rotated through 135 degrees in the counterclockwise direction.

Thus, by orienting the interference fringes 401, 402, 403, 404 which are generated in the individual areas of the microlens array 175 in the different directions, the interference fringes generated by the individual laser beams are dispersed to be made less conspicuous in a combined laser beam 405 which is formed by superposing the individual laser beams one on another.

Consequently, by adopting the configuration in which laser beams emitted from the individual light sources of the light source unit 60 are superposed one on another by the microlens array 175 and the collective lens 178 and the respective laser beam emitting elements of the light sources which shine laser beams are disposed at the different angles from one another so that the resulting interference fringes are oriented in the different directions in the combined laser beam 405, the number of levels of brightness or darkness of the interference fringes is increased, and the interference fringes are dispersed, whereby the interference fringes can be made less conspicuous.

In this embodiment, while the configuration has been described in which the patterns of the interference fringes are made to differ from one another in the red light sources 121 which emit red light of a long wavelength and which are made up of the four laser beam emitting elements, as a configuration to make interference fringes less conspicuous, the interference fringes can be made less conspicuous by adopting even a configuration in which at least one of the laser beam emitting elements is rotated without rotating the four elements through the different angles.

Additionally, also as to the blue light sources 135 which are made up of the two laser beam emitting elements which are disposed so as to be sandwiched by the red light sources 121 and which emit blue light of a short wavelength, the interference fringes can be made less conspicuous in the event that they are disposed at different angles.

Thus, according to this embodiment, it is possible to provide the light source unit 60 which can be configured as the small and high-intensity light source which can reduce the interference fringes by using the plurality of light sources and with the simple construction and which is suitable for use in the projector 10 and the projector 10 which can project a small and highly bright image of which the quality is prevented from being deteriorated by the interference fringes.

In addition, according to the embodiment, since the interference fringes generated by the plurality of laser beam emitting elements are rotated at the equal angular intervals to be superposed one on another, it is possible to make the interference fringes less conspicuous effectively.

Additionally, according to the embodiment, the laser beams emitted from the light sources are shone on to the predetermined shining areas on the microlens array 175 via the dichroic mirror 173, whereby the laser beams of the different colors can effectively be incident on the microlens array 175.

Further, according to the embodiment, the laser beams from the plurality of laser beam emitting elements can effectively be combined together and are collected to be superposed one on another, whereby it is possible to make the interference fringes less conspicuous.

Furthermore, according to the embodiment, it is possible to reduce with good efficiency the interference fringes generated by the laser beam emitting elements of the red light sources 121 which emit the red laser beams whose wavelength is long and which tend to affect the eyes of a viewer uncomfortably and which are provided in the larger number.

(Third Embodiment)

Hereinafter, a third embodiment of the invention will be described.

It is noted that a projector according to an invention of the third embodiment is the same as the projector 10 which has been described above by reference to FIGS. 1 to 6.

An arrangement of laser diodes is shown in FIG. 16. The laser diodes are arranged in the same way as the way shown in FIG. 5.

Pencils of Red light emitted from red laser diodes (as FIG. 5 doing, FIG. 16 showing two red laser diodes in the same row in four red laser diodes provided) which are four red light source elements 121 which make up a red light source 120 are converted into pencils of light some of which are collected in a slight diffuse manner by collimator lenses 125 or some of which are collected in a slight convergence manner (hereinafter a degree of diffuse or convergence referring to as "collecting degree") by collimator lenses 125 so that each pencils of red light having a slightly different "collecting degree" with one another is incident on a microlens array 175.

Additionally, blue light from blue laser diodes (as FIG. 5 doing, FIG. 16 showing one of two blue laser diodes provided which is aligned with the aforesaid two red laser diodes in the same row) which are two blue light source elements 131 which make up a blue light source device 130 is converted into pencils of light which are collected in respective different "collecting degrees" by collimator lenses 135 to be incident on the microlens array 175.

Namely, in the third embodiment, in collecting laser beams from the four red light source elements 121 by the collimator lenses 125, pencils of light which are laser beams emitted from the individual red light source elements 121 are made to be collected in respective different "collecting degrees", whereby interference fringes generated thereby come to have different pitches.

FIGS. 17A to 17D are explanatory diagrams which illustrate interference fringes which are generated in optical images by light beams emitted from the individual light source elements. Optical images 400, 401, 402, 403 show individually interference fringes which are generated in optical images formed on a surface of a display element 51 by laser beams emitted from the four individual red light source elements 121. As shown in FIGS. 17A to 17D, interference fringes generated in the optical images 400, 401, 402, 403 have different pitches.

Consequently, when the laser beams which are collected in respective different "collecting degrees" are superposed one on another on the surface of the display element 51 which constitutes a predetermined surface by a shining optical system 170, that is, when the optical images 400, 401, 402, 403 shown in FIGS. 17A to 17D are superposed one on another, the brightness or darkness of the individual interference fringes which are generated by the four red light source elements 121 are made to have a plurality of different levels, and the widths of the fringes are narrowed, whereby it becomes difficult to identify the fringes on a surface of a projection image, thereby making it possible to enhance the quality of the projection image.

Similarly, laser beams from the two blue light source elements 131 are made to be collected in respective different "collecting degrees", whereby interference fringes generated by the laser beams from the two blue light source elements 131 come to have different pitches.

The configurations of the light source devices of the third embodiment which emit the laser beams which are collected in respective different "collecting degrees" are the same as those of the first embodiment and the second embodiment. Flange portions 91 of the red light source elements 121 and the blue light source elements 131 are inserted in predetermined depressions on a diode holding member 103 having a flat plate-like shape in such a manner that the light source elements are disposed in predetermined positions at predetermined intervals while axes of laser beams emitted from the individual light source elements are made parallel to one another.

FIG. 16 is a schematic sectional view showing as an example the constructions of the light source devices of a light source unit 60 of a projector according to the third embodiment of the invention.

As shown in FIG. 16, a lens holding member 105 having a diode accommodating portion 107 is mounted on the diode holding member 103, and cylinder portions 93 for the red light source elements 121 and the blue light source elements 131 are accommodated in the diode accommodating portion 107. Then, front surfaces of circumferential edges of the flange portions 91 are pressed against by the lens holding member 105, whereby the light source elements are fixed in place individually.

Additionally, the collimator lenses 125, 135 are fixedly inserted in the lens holding member 105. The laser diodes which are the light source elements and the collimator lenses are positioned a predetermined distance apart from each other by the position of step portions 109. Further, optical axes of the individual collimator lenses are caused to coincide with axes of laser beams emitted from the individual light source elements by the position of lens fixing holes, whereby the light source devices are made by combinations of the collimator lenses and the light source elements.

Lead wires 1 of the individual light source devices which are the red light source elements 121 and the blue light source elements 131 are passed through the lens holding member 105 to be connected to a light source control circuit 41 via a flexible circuit board, not shown, on a heat sink 78 side of the lens holding member 105.

Additionally, in this embodiment, radii of curvature of laser beam entrance surfaces or exit surfaces of the four collimator lenses 125 which correspond to the four red light source elements 121 are made to differ from one another, so that focal lengths of the four collimator lenses 125 are made to differ from one another. "collecting degree" of Light becomes smaller as a radius of curvature becomes larger, while "collecting degree" of light becomes larger as a radius of curvature becomes smaller.

It is noted that radii of curvature of both the entrance surfaces and the exit surfaces of the collimator lenses 125 are made to differ from one another among the collimator lenses 125 from time to time.

Consequently, even with a light source device in which red light source elements 121 having the same light emitting characteristics are combined with collimator lenses 125 which are disposed in the same positional relationship with the red light source elements 121, laser beams which are emitted from the individual light sources to pass through the corresponding collimator lenses 125 are collected in respective different "collecting degrees".

In addition, when the laser beams from the individual light sources are shone on to a mirror surface of the display element 51 which constitutes a predetermined surface via the microlens array 175, the collective lens 178 and the like which make up the shining optical system 170, interference fringes formed on the predetermined surface by the laser beams come to have different pitches based on "collecting degrees" of laser beams when emitting from the individual light sources.

Even with collimator lenses 125 which are the same in shape and size, in the event that the collimator lenses 125 are made of different materials, for example, glass materials having different refractive indexes, the collimator lenses 125 have individually different focal lengths, thereby even laser beams emitted from light sources having the same construction can be made to be collected in respective different "collecting degrees". For example, glass, KT (KTaO$_3$) crystal and the like can be used as materials for collimator lenses 125.

Further, in collimator lenses 125 made of the same glass material or different glass materials, it occurs from time to time that different thicknesses are given thereto so as to allow the collimator lenses 125 to have different focal lengths so that laser beams from the light sources are made to be collected in respective different "collecting degrees". Alternatively, it also occurs from time to time that collimator lenses 125 having the same focal length or different focal lengths are used with the step portions 109 of the lens holding member 105 positioned differently so that laser beams which pass through the collimator lenses 125 are made to be collected in respective different "collecting degrees". The "collecting degrees" of light by the collimator lens 125 is increased as the thickness thereof is increased, whereas the "collecting degrees" of light by the collimator lens 125 is decreased as the thickness thereof is decreased. Additionally, the "collecting degrees" of light by the collimator lens 125 is increased as the distance between the collimator lens 125 and the light source element is increased or the collimator lens 125 is spaced further away from the light source element, whereas the "collecting degrees" of light by the collimator lens 125 is decreased as the distance between the collimator lens 125 and the light source element is decreased or the collimator lens 125 is spaced less away from the light source element.

Similarly, in the two blue light source elements 131, the focal lengths of the collimator lenses 135 which are combined with the corresponding blue light source elements 131 or the distances between the collimator lenses 135 and the corresponding blue light source elements 131 are made to differ from each other so that pencils of light which are emitted from the blue light source elements 131 and which pass through the collimator lenses 135 to be incident on the microlens array 175 are made to be collected in respective different "collecting degrees".

However, the difference in "collecting degrees" of the collimator lenses 135 should fall within a range of several degrees which is a range within which light incident on individual microlenses of the microlens array 175 is emitted from the same microlenses and should be determined to fall within a range which matches the lens characteristics of the microlenses.

Specifically, a radius of curvature for the collimator lenses 135 is set to range from 2.15 mm to 6.15 mm, a thickness is set to range from 2.2 mm to 4.5 mm, and a distance between the collimator lenses 135 and the corresponding light source elements is set to range from 1.3 mm to 4.2 mm.

In this way, the pencils of light emitted from the individual light sources of the red light source device 125 or the blue light source device 130 are made to be collected in respective different "collecting degrees". Then, when the pencils of light which are collected in respective different "collecting degrees" pass through the microlens array and thereafter are collected to the surface of the display element which constitutes the predetermined surface via the collective lens 178 and the like, the pitches of the interference fringes generated by the laser beams from the different light sources come to differ from one another or each other.

Consequently, the patterns of the interference fringes generated by the laser beams from the individual light sources are made to differ, so that when the laser beams from the individual light sources are superposed one on another or each other on the plane in the predetermined position, the number of levels of brightness or darkness of the interference fringes is increased and the spaces between the fringes are narrowed, whereby the interference fringes can be made less conspicuous.

With the projector 10 which employs the light source unit 60, the pattern of the interference fringes in a projection image is made less conspicuous, whereby the quality of the projection image can be enhanced.

Additionally, using the collimator lenses which are different in thickness or radius of curvature of the lens surface can easily make the pencils of light from the light sources be collected in respective different "collecting degrees" only by selecting the collimator lenses for combination with the light source elements, whereby the interference fringes can be made less conspicuous.

Further, using the collimator lenses made of different materials so as to have different refractive indexes can easily make the pencils of light from the light sources be collected in respective different "collecting degrees" in the event that even the members of the same shape and the same construction are combined together, whereby the interference fringes can be made less conspicuous. Additionally, the assemblage of the light sources can be facilitated since the constituent components having the same shape only have to be combined together.

Furthermore, the light sources in which the distances between the light source elements and the collimator lenses are made to differ from one another or each other can easily be fabricated by controlling the distances in the assemblage of the light sources.

In addition, in the event that light sources which emit light beams in the same wavelength range are combined together, the light beams from the individual light sources are superposed to make bright the surface illuminated by the laser beams while interference fringes generated thereon by the light beams from the individual light sources can be made less conspicuous due to different pitches being given to the interference fringes.

Additionally, the provision of the microlens array and the collective lens allows superposed light beams to be collected to the surface of the display element 51 which constitutes the predetermined surface, whereby the bright illuminated surface and hence the projection image where the interference fringes are made less conspicuous can be formed.

In addition, the invention is not limited to the embodiments that have been described heretofore, and hence, the invention can be modified variously in various steps in carrying out the invention without departing from the spirit and cope thereof. Additionally, as many functions which are carried out in the embodiments as possible may be combined together as required. Various stages at which the invention is carried out are included in the embodiments that have been described above, and various inventions can be extracted by combining a plurality of disclosed constituent factors. For example, as long as the expected advantage can be obtained even in the event that some of the whole constituent factors that are disclosed in the embodiments are deleted, the configuration from which those constituent factors are deleted can be extracted as an invention.

What is claimed is:

1. A light source unit comprising:
a plurality of light sources, each of the plurality of light sources combining (i) a light source element which emits a laser beam, and (ii) a collimator lens which is aligned with the light source element so as to collect the laser beam emitted from the light source element, wherein each of the laser beams emitted from the light source elements of the plurality of light sources has a wavelength range of a same color, and wherein collecting degrees of pencils of the laser beams which are respectively emitted from the collimator lenses are different from one another, the collecting degrees being degrees to which the pencils of the laser beams are diffuse or convergent; and
a microlens array and a condenser lens which superpose the pencils of the laser beams emitted from the collimator lenses and having the respective different collecting degrees on a predetermined surface of a display element.

2. The light source unit according to claim 1, wherein radii of curvature of the collimator lenses differ between the collimator lenses.

3. The light source unit according to claim 1, wherein thicknesses of the collimator lenses differ between the collimator lenses.

4. The light source unit according to claim 1, wherein materials of the collimator lenses differ between the collimator lenses.

5. The light source unit according to claim 1, wherein distances between the light source elements and the collimator lenses of the light sources differ between the collimator lenses.

6. The light source unit according to claim 1, wherein the individual light source elements of the plurality of light sources emit light in the same wavelength range.

7. A projector comprising:
the light source unit according to claim 1;
a display device onto which light source light from the light source unit is shone to thereby form image light;
a projection side optical system which projects the image light emitted from the display device onto a screen; and
a projector control unit which controls the display device and the light source unit.

* * * * *